(12) United States Patent
Oouchida

(10) Patent No.: US 8,405,820 B2
(45) Date of Patent: Mar. 26, 2013

(54) RANGING DEVICE AND RANGING MODULE AND IMAGE-CAPTURING DEVICE USING THE RANGING DEVICE OR THE RANGING MODULE

(75) Inventor: Shigeru Oouchida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 116 days.

(21) Appl. No.: 12/980,809

(22) Filed: Dec. 29, 2010

(65) Prior Publication Data
US 2011/0170086 A1    Jul. 14, 2011

(30) Foreign Application Priority Data
Jan. 13, 2010   (JP) ................................. 2010-004475

(51) Int. Cl.
*G01C 3/08* (2006.01)
(52) U.S. Cl. .................................................... 356/4.01
(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

| | | | | |
|---|---|---|---|---|
| 4,293,205 A | * | 10/1981 | Tokutomi et al. | 396/117 |
| 4,469,939 A | * | 9/1984 | Utagawa | 250/204 |
| 6,337,736 B1 | * | 1/2002 | Sugiyama et al. | 356/3.14 |

FOREIGN PATENT DOCUMENTS

| | | |
|---|---|---|
| JP | 3090078 | 7/2000 |
| JP | 4226936 | 12/2008 |

* cited by examiner

*Primary Examiner* — Luke Ratcliffe
(74) *Attorney, Agent, or Firm* — Oblon, Spivak, McClelland, Maier & Neustadt, L.L.P.

(57) ABSTRACT

A ranging device including: a lens array member which has first and second ranging lenses, optical axes of the pair of ranging lenses being parallel to each other, and first and second optical images of a subject being formed by the first and the second ranging lenses respectively; a mirror array member which has first and second reflecting members, each of the pair of reflecting members being provided with a reflecting plane; a medium mirror member which has first and second reflecting planes, the medium mirror member being arranged between the pair of reflecting members; an imaging element which is configured to convert the first and the second optical images to electronic signals; and an electronic circuit which is configured to calculate a distance to the subject based on the electronic signals output from the imaging element.

9 Claims, 5 Drawing Sheets

RANGING DEVICE AND RANGING MODULE AND IMAGE-CAPTURING DEVICE USING THE RANGING DEVICE OR THE RANGING MODULE

CROSS-REFERENCE TO THE RELATED APPLICATION

The entire contents of Japanese patent application No. JP 2010-004475, filed on Jan. 13, 2010, of which the convention priority is claimed in this application, are incorporated hereinto by reference.

BACKGROUND OF THE INVENTION

1. Field of the Invention

The present invention relates to a compound-eye-type ranging device, which is capable of resolving a measurement error caused by a variation with time or a change in temperature and stably measuring a distance from a main body of the ranging device to a ranging target, and to a ranging module having the ranging device. The present invention further relates to an image-capturing device which uses the ranging device or the ranging module.

2. Description of the Related Art

Conventionally, a stereo type (compound-eye-type) ranging device is known in which optical axes of the same ranging optical systems are arranged parallel to each other, images of a subject which is a ranging target obtained from each of the ranging optical systems are compared, displacements (parallax) of the images relative to the same subject are detected, and a distance from a main body of the device to the subject is measured.

FIG. 9 is a schematic side view of a ranging device illustrating a fundamental principle of range measurement by such a stereo camera type ranging device. In such a stereo type ranging device, the distance measurement to a subject is carried out based on a triangulation method.

In FIG. 9, 1 represents a subject, 2 represents a ranging device, A' represents a distance from the subject 1 to the ranging device 2 (more specially, a distance from the subject 1 to a principal point of a ranging lens described later). The ranging device 2 has a first ranging optical system 3 and a second ranging optical system 4.

In brief, the first ranging optical system 3 has a ranging lens 3A and a ranging image receiving element 3B, the second ranging optical system 4 has a ranging lens 4A and a ranging image receiving element 4B. The first ranging optical system 3 and the second ranging optical system 4 are fixed to a fixed base (stage) 5. Each of the ranging image receiving elements 3B and 4B has a plurality of pixels arranged in a row at a predetermined interval, as illustrated in FIG. 10.

An optical axis O1 of the first ranging optical system 3 and an optical axis O2 of the second ranging optical system 4 are parallel to each other. A distance from the optical axis O1 to the optical axis O2 is called a base length, and the base length is represented by a sign D in FIG. 9.

Here, such a case in which a distance to the subject 1 is measured by means of the ranging device 2, i.e., the subject 1 is imaged by means of the first ranging optical system 3 and the second ranging optical system 4, is considered.

Image-forming luminous flux P1 from the subject 1 passes through the ranging lens 3A of the first ranging optical system 3, and forms an image on an image receiving pixel 3C of the ranging image receiving element 3B. Image-forming luminous flux P2 from the subject 1 passes through the ranging lens 4A of the second ranging optical system 4, and forms an image on an image receiving pixel 4C of the image receiving element 4B. The images formed on the image receiving pixels 3C and 4C are converted into electronic signals, and are output to a ranging computing circuit.

An image receiving position on the image receiving pixel 3C of the ranging image receiving element 3B is different from that on the image receiving pixel 4C of the ranging image receiving element 4B, by parallax of the first ranging optical system 3 and the second ranging optical system 4 to a same point IA of the subject 1. The parallax is generated as a displacement in a direction perpendicular to both the optical axes O1 and O2, in a plane including the optical axes O1 and O2.

Here, when a focal length of each of the ranging lenses 3A and 4A is set to be f, the distance A' is substantially greater than the focal length of each of the ranging lenses 3A and 4A, i.e., there is a relationship of A'>>f mathematically, if the parallax is set to be Δ, and the following relational expression "Formula 1" is established.

$$A' = D \times (f/\Delta) \quad \text{(Formula 1)}$$

Because the base length D, and the focal length f of each of the ranging lenses 3A and 4A are given, when the parallax Δ is known, the distance A' from the subject 1 to the ranging device 2 can be calculated from the relational expression of the Formula 1.

The parallax Δ is calculated based on positions of the image receiving pixels 3C and 4C, as illustrated in FIG. 10. Circle marks (○) in FIG. 10 illustrate images of the same point of the subject 1 formed at the positions of the image receiving pixels 3C and 4C. In addition, a circle mark illustrated with a dashed line on the ranging image receiving element 4B virtually illustrates an image of the subject formed on the ranging image receiving element 3B. The parallax Δ is obtained as a sum of a displacement amount ΔY1 in a horizontal direction from a center O of the pixels of the ranging image receiving element 3B to the image receiving pixel 3C, and a displacement amount ΔY2 in a horizontal direction from a center O of the pixels of the ranging image receiving element 4B to the image receiving pixel 4C.

In this way, a method of calculating the distance A' based on the parallax Δ of the two images is the triangulation method. However, due to various causes of error, it is difficult to obtain the parallax Δ accurately with the triangulation method which uses the two ranging optical systems 3 and 4.

For example, when the optical axis O1 of the ranging lens 3A and the optical axis O2 of the ranging lens 4A are not parallel, an error is included in the parallax Δ. In addition, when the plurality of pixels of the ranging image receiving element 3B or the plurality of pixels of the ranging image receiving element 4B are not lined up on a straight line but inclined, the position of the center O of the pixels of the ranging image receiving element 3B or of the ranging image receiving element 4B shifts, and an error is included in the parallax Δ as well.

Furthermore, the biggest cause of errors is a displacement of the ranging lens 3A (4A) with the ranging image receiving element 3B (4B), i.e., a displacement of the optical axis O1 of the ranging lens 3A (the optical axis O2 of the ranging lens 4A) with the center O of the pixels of the ranging image receiving element 3B (the center O of the pixels of the ranging image receiving element 413).

The reason is that, when the ranging lens 3A (the ranging lens 4A) shifts, the optical axis O1 (the optical axis O2) shifts by only the same amount as the shift amount of the ranging lens 3A (the ranging lens 4A); therefore, when the ranging image receiving element 3B (the ranging image receiving element 4B) is assumed to be at a fixed position, the shift amount of the ranging lens 3A (4A) directly appears as the error of the parallax Δ.

The reality is that it is quite difficult to remove these causes of error completely. Moreover, it is insufficient to only remove the causes of error temporarily, and it is necessary to remove the causes of error such as variations with time and changes in the ambient temperature which are long-term environmental variations.

For example, JP 3090078 B discloses a technology by which ranging can be carried out with high accuracy without being influenced by a change in the ambient temperature. When plastic lenses are used for the ranging lenses 3A and 4A, to reduce the cost of the ranging device 2, the plastic expands by a change in temperature, the base length D and the positions of the ranging lenses 3A and 4A change, and a ranging error increases. Therefore, a technology to countermeasure this is disclosed in JP 3090078 B, in which, even if the ranging lenses 3A and 4A expand by the change in temperature, an interval between the optical axis O1 and the optical axis O2, i.e., the base length D does not change.

In addition, JP 4226936 B discloses a correction method in which a ranging error generated by a change in the ambient temperature is corrected by a temperature sensor, and a ranging error to a rapid change in temperature is corrected by using a timer. The reason for performing the correction with use of the timer is that it can not respond to the rapid change in temperature by just the correction with only the temperature sensor.

However, in the technology disclosed in JP 3090078 B, the number of parts increases because of a structure of a ranging lens being pressed by a plate spring. Moreover, it is necessary to adjust each of the ranging lenses 3A and 4A, therefore, the assembly process is more complex, and the cost of manufacturing increases.

On the other hand, in the technology disclosed in JP 4226936 B, a change in the base length D by a temperature expansion of the ranging lens is corrected with the temperature sensor, and the timer is used in combination with the temperature sensor, because the change in the base length D can not be corrected completely by just the temperature sensor. The sensor and the timer, as well as a control circuit which controls the sensor are necessary when performing the correction with the sensor and the timer, and as in the technology disclosed in JP 3090078 B, the number of parts increases, and the component cost and the cost of manufacturing increase.

In general, the ranging image receiving elements 3B and 4B are made of a silicon-based material, and an expansion due to a rise in temperature is small. On the other hand, the ranging lenses 3A and 4A are produced with a plastic material which expands greatly due to the rise in temperature. An error due to the change in temperature is caused by the expansion of the plastic material due to the rise in temperature.

Therefore, great displacements of the ranging lenses 3A, 4A with the ranging image receiving elements 3B and 4B respectively are generated. For example, the base length D between the optical axis O1 of the ranging lens 3A and the optical axis O2 of the ranging lens 4A is 5 mm, the distance A' from the center of the ranging lenses 3A and 4A to the subject 1 is 5 m, and if the focal length f of the ranging lenses 3A and 4A is set to be 5 mm, according to the Formula 1, the parallax Δ is $$\Delta = D \cdot f / A' = 5 \, \mu m \quad \text{(Formula 2)}$$

That is, in the ranging device 2, when there is a parallax Δ of 5 μm, the distance A' is recognized to be 5 m.

On the other hand, if the linear coefficient of expansion α of a plastic lens is $6 \times 10^{-5}$, when the change in temperature Δt is 10 degrees Celsius, a displacement of the base length D is, $$D \times \alpha \times \Delta t = 3 \, \mu m \quad \text{(Formula 3)}$$

This is equal to the parallax increasing 3 μm. As a result, when the change in temperature is 10 degrees Celsius, even if measuring a distance of the same distance 5 m, a great ranging error of 60% (=3 μm/5 μm) will be generated.

SUMMARY OF THE INVENTION

At least an object of the present invention is to provide a ranging device which is capable of carrying out a stable distance measurement as much as possible, relative to any change in a surrounding temperature, and to provide a ranging module having the ranging device. In addition, at least another object of the present invention is to provide an image-capturing device which uses the ranging device or the ranging module.

In light of the above-mentioned, according to an aspect of the present invention, a ranging device includes: a lens array member which has a first ranging lens and a second ranging lens, optical axes of the pair of ranging lenses being parallel to each other, and first and second optical images of a subject being formed by the first and the second ranging lenses respectively; a mirror array member which has first and second reflecting members, each of the pair of reflecting members being provided with a reflecting plane which reflects a corresponding optical image of the first and the second optical images from a corresponding ranging lens of the pair of ranging lenses; a medium mirror member which has a first reflecting plane and a second reflecting plane, the medium mirror member being arranged between the pair of reflecting members, the first and the second reflecting planes reflecting the first and the second optical images reflected by the reflecting planes of the first and the second reflecting members, respectively, to a predetermined direction; an imaging element which is arranged at a position receiving the first and the second optical images reflected by the first and the second reflecting planes of the medium mirror member respectively to the predetermined direction, and is configured to convert the first and the second optical images to electronic signals; and an electronic circuit which is configured to calculate a distance to the subject based on the electronic signals output from the imaging element.

According to a preferable embodiment of the present invention, the lens array member and the mirror array member are formed integrally.

According to another preferable embodiment of the present invention, the lens array member and the mirror array member are formed of materials having approximately-same coefficients of linear expansion or of the same material, and the lens array member and the mirror array member are formed separately.

According to a further preferable embodiment of the present invention, the medium mirror member and the mirror array member are formed separately.

According to a further preferable embodiment of the present invention, the material of the lens array member and the mirror array member is plastic.

According to a further preferable embodiment of the present invention, the imaging element is formed integrally with a wafer substrate, and the lens array member and the mirror array member are formed together with the wafer substrate.

According to a further preferable embodiment of the present invention, each of the reflecting planes of the first and the second reflecting members inclines to a corresponding optical axis of the first and the second ranging lenses by 45 degrees, and each of the first and the second reflecting planes of the medium mirror member inclines to a corresponding optical axis of the first and the second ranging lenses by 45 degrees.

According to another aspect of the present invention, a ranging module includes: a lens array member which has a first ranging lens and a second ranging lens, optical axes of the pair of ranging lenses being parallel to each other, and first and second optical images of a subject being formed by the first and the second ranging lenses respectively; a mirror array member which has first and second reflecting members, each of the pair of reflecting members being provided with a reflecting plane which reflects a corresponding optical image of the first and the second optical images from a corresponding ranging lens of the pair of ranging lenses; a medium mirror member which has a first reflecting plane and a second reflecting plane, the medium mirror member being arranged between the pair of reflecting members, the first and the second reflecting planes reflecting the first and the second optical images reflected by the reflecting planes of the first and the second reflecting members, respectively, to a predetermined direction; an imaging element which is arranged at a position receiving the first and the second optical images reflected by the first and the second reflecting planes of the medium mirror member respectively to the predetermined direction, and is configured to convert the first and the second optical images to electronic signals; and an electronic circuit which is configured to calculate a distance to the subject based on the electronic signals output from the imaging element, wherein the lens array member and the mirror array member are formed integrally, the medium mirror member is formed separately from the mirror array member, and the lens array member and the mirror array member are formed together with the imaging element.

According to a further preferable embodiment of the present invention, an image-capturing device includes the above-mentioned ranging device.

According to a further preferable embodiment of the present invention, an image-capturing device includes the above-mentioned ranging module.

According to a further preferable embodiment of the present invention, the image-capturing device includes an automatic focus control part, which is configured to scan a neighborhood of a distance to the subject obtained by the ranging device, and to detect a focusing position to the subject.

BRIEF DESCRIPTION OF THE DRAWINGS

The invention will be described further below with reference to exemplary embodiments and the accompanying schematic drawings, in which.

DETAILED DESCRIPTION OF THE PREFERRED EMBODIMENTS

Figure 1:
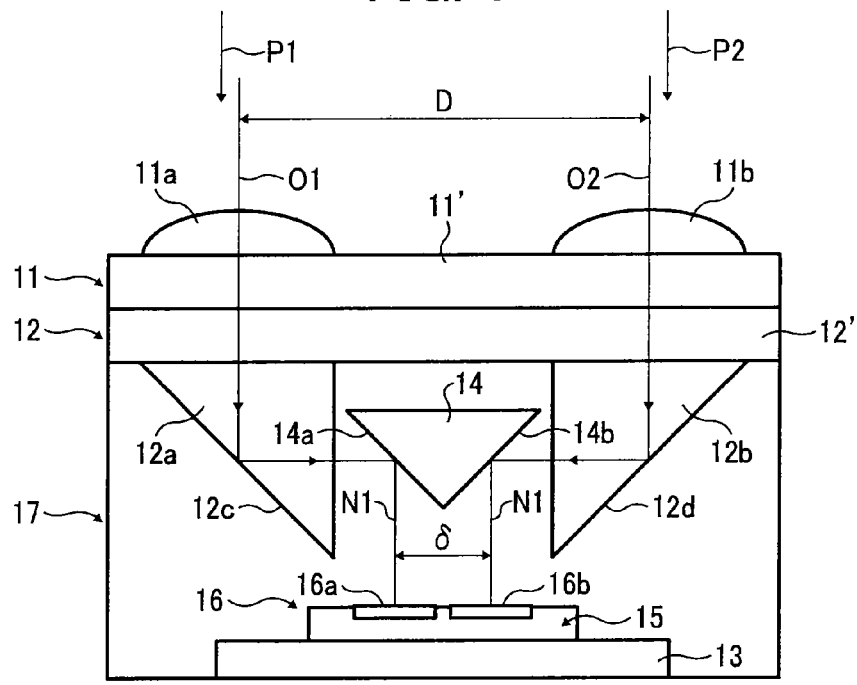
FIG. 1 is a structural schematic view of an optical system of a ranging device according to an embodiment of the present invention.

Hereafter, a preferable embodiment of the present invention will be explained with reference to the drawings. FIG. 1 illustrates a framework of an optical system of a ranging device according to the present invention. As illustrated in FIG. 1, 11 represents a lens array member, 12 represents a mirror array member, 13 represents a circuit board, and 14 represents a medium mirror member. The lens array member 11 has a flat plate part 11', a pair of ranging lenses 11a and 11b are formed integrally on the flat plate part 11', optical axes O1 and O2 of the pair of ranging lenses 11a and 11b being parallel to each other. An interval between the optical axis O1 of the ranging lens 11a and the optical axis O2 of the ranging lens 11b is set as a base length D.

The mirror array member 12 has a flat plate part 12', and a pair of reflecting members 12a and 12b are formed integrally on the flat plate part 12'. The reflecting member 12a has a reflecting plane 12c corresponding to the ranging lens 11a, and the reflecting member 12b has a reflecting plane 12d corresponding to the ranging lens 11b.

The lens array member 11 and the mirror array member 12 are formed of a plastic material having, for example, a linear coefficient of expansion $\alpha$ of $6\times10^{-5}$. Here, the reflecting plane 12c of the reflecting member 12a is arranged to be inclined to the optical axis O1 by 45 degrees, and the reflecting plane 12d of the reflecting member 12b is arranged to be inclined to the optical axis O2 by 45 degrees. The reason will be explained later.

The flat plate part 11' of the lens array member 11 and the flat plate part 12' of the mirror array member 12, for example, are integrated by an adhesive. The medium mirror member 14 is formed separately from the flat plate part 12', and is arranged between the pair of reflecting members 12a and 12b. Here, though the medium mirror member 14 is formed of a plastic material, it is possible to form the medium mirror member 14 with a silicon-based material which has a linear coefficient of expansion smaller than the linear coefficient of expansion $\alpha$ of the plastic material. The medium mirror member 14 has a first reflecting plane 14a and a second reflecting plane 14b. The reason for forming the medium mirror member 14 separately from the flat plate part 12' will be explained later.

In the present embodiment, the flat plate part 11' of the lens array member 11 and the flat plate part 12' of the mirror array member 12 are integrated by the adhesive, but this is not a limitation. When the lens array member 11 and the mirror array member 12 are shaped together with a mold tool by an injection molding device or the like, a lens-mirror assembly with a high accuracy can be easily produced.

It is preferable that each of an angles of gradient of the first reflecting plane 14a to the optical axis O1, and of the second reflecting plane 14b to the optical axis O2, be 45 degrees. Due to an imaging element 16 being formed from a silicon-based material, a linear coefficient of expansion thereof is far smaller compared with the linear coefficient of expansion α of the plastic material.

An image-forming luminous flux P1 by the ranging lens 11a is reflected by the reflecting plane 12c of the reflecting member 12a. And, the image-forming luminous flux P1 is further reflected by the first reflecting plane 14a of the medium mirror member 14, and is guided to an imaging area 16a of the imaging element 16 by a structure which will be explained later. Thus, a subject image is formed in the imaging area 16a.

An image-forming luminous flux P2 by the ranging lens 11b is reflected by the reflecting plane 12d of the reflecting member 12b. And, the image-forming luminous flux P2 is further reflected by the second reflecting plane 14b of the medium mirror member 14, and is guided to an imaging area 16b of the imaging element 16. Thus, a subject image is formed in the imaging area 16b.

On the circuit board 13, the imaging element 16 such as CMOS and CCD is formed on a same semiconductor wafer 15. The imaging element 16 is formed by a semiconductor process. The imaging element 16 has rectangular imaging areas 16a and 16b each of which consists of a plurality of pixels arranged in a matrix state (refer to FIG. 4).

Patterning is performed on the semiconductor wafer 15 with a mask (illustration is omitted). Here, a mask with a pattern in which the pixel matrix of the imaging area 16a and the pixel matrix of the imaging area 16b are parallel is used (illustration is omitted).

Because a surface of the semiconductor wafer 15 is a plane, normal lines N1 of the imaging areas 16a and 16b are parallel inevitably. Therefore, when two subject images respectively formed in the imaging areas 16a and 16b are compared, it is not necessary to perform an angular misalignment correction of the imaging areas 16a and 16b, which is necessary traditionally. In addition, it is only necessary to mount one imaging element 16, therefore the number of parts can be reduced and a mounting process can be simplified.

Here, the imaging areas 16a and 16b are arranged at a regular interval δ. The reason that the imaging areas 16a and 16b are arranged separately is to prevent the image-forming luminous flux P1 (P2) entering into the one imaging area 16a (16b) from mixing into the other imaging area 16b (16a), without providing a light shielding wall between the imaging area 16a and the imaging area 16b.

An electronic circuit having a ranging computing circuit and a digital signal processor (DSP) is provided on the circuit substrate 13. Image signals detected by each of the pixel matrixes of the two imaging areas 16a and 16b are compared by these electronic circuits, and information on a distance to the subject is obtained. A ranging module 17 is formed by the lens array member 11, the mirror array member 12, the circuit board 13, the medium mirror member 14 and the semiconductor wafer 15 together.

Next, an effect of integrating the lens array member 11 and the mirror array member 12 will be explained, with reference to FIG. 2 and FIG. 3. Here, in FIG. 2 and FIG. 3, a direction along the optical axes O1 and O2 is set as a Z axis, a direction which is perpendicular to the Z axis and connects the optical axes O1 and O2 is set as a Y axis, and a direction which is perpendicular to both the Z axis and the Y axis is set as an X axis. In this case, the ranging lenses 11a and 11b are located on an XY plane, and a center O of both the ranging lenses 11a and 11b is on a straight line along the Y axis. In this case, a direction in which parallax Δ is generated is the Y axis direction.

Figure 2:
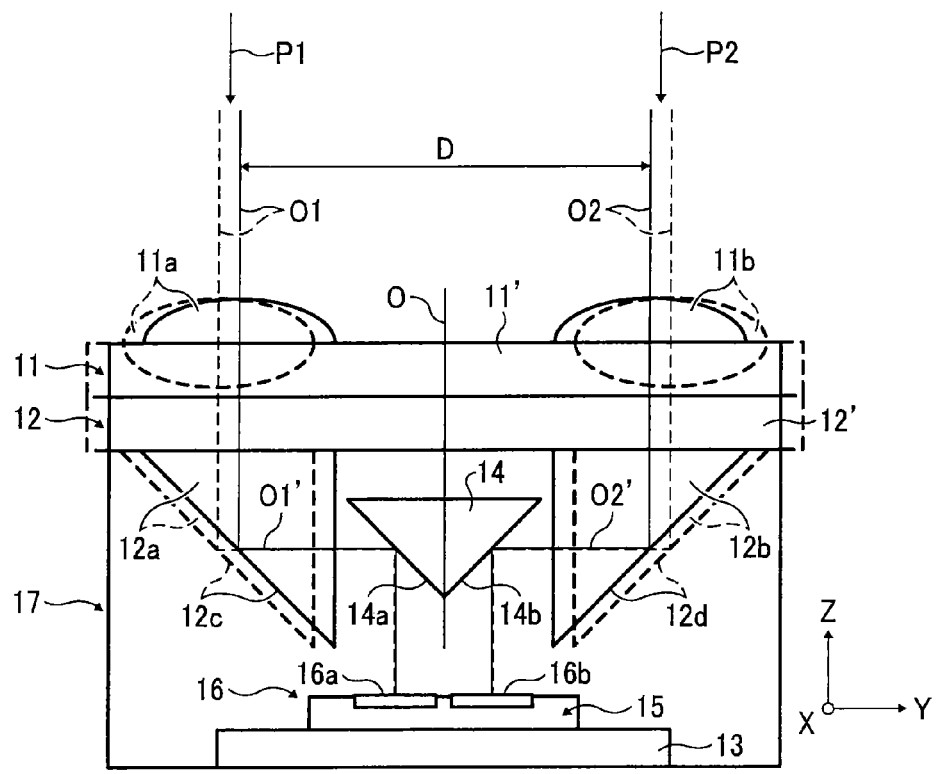
FIG. 2 is a figure explaining an effect of offset of a displacement of a subject image on an imaging element when a temperature is changed.

FIG. 2 illustrates with dashed lines a state in which the lens array member 11 and the mirror array member 12 are expanded due to a change in temperature. When the lens array member 11 expands due to a rise in temperature, each of the optical axes O1 and O2 of the ranging lenses 11a and 11b is moved in such a direction that the base length D is increased, as illustrated by the dashed lines.

Accompanying this, the mirror array member 12 expands by only the same amount as the lens array member 11, and an interval between the reflecting planes 12c and 12d increases corresponding to an increase in the base length D.

That is, the interval between the reflecting planes 12c and 12d changes in a direction that offsets displacements of the optical axes O1 and O2 relative to the reflecting planes 12c and 12d respectively, when the displacements of the optical axes O1 and O2 are caused due to the rise in temperature. Therefore, positions of reflecting light axes O1' and O2' do not change even if displacements of the optical axes O1 and O2 are generated due to the rise in temperature. Therefore, as illustrated in FIG. 2, the subject image is formed at the same part of the imaging area 16a, regardless of the change in temperature, similarly, the subject image is formed at the same part of the imaging area 16b regardless of the change in temperature. In addition, in a case where the medium mirror member 14 is formed of the plastic material, although the medium mirror member 14 also expands, due to the interval 5 (refer to FIG. 1) being small compared with the base length D, the expansion of the medium mirror member 14 by the change in temperature of the medium mirror member 14 can be substantially disregarded. Therefore, when the lens array member 11 and the mirror array member 12 are formed of the same plastic material and are integrated, a ranging error generated by the change in temperature can be resolved, and a distance measurement with high accuracy can be achieved by only an initial adjustment.

Figure 3:
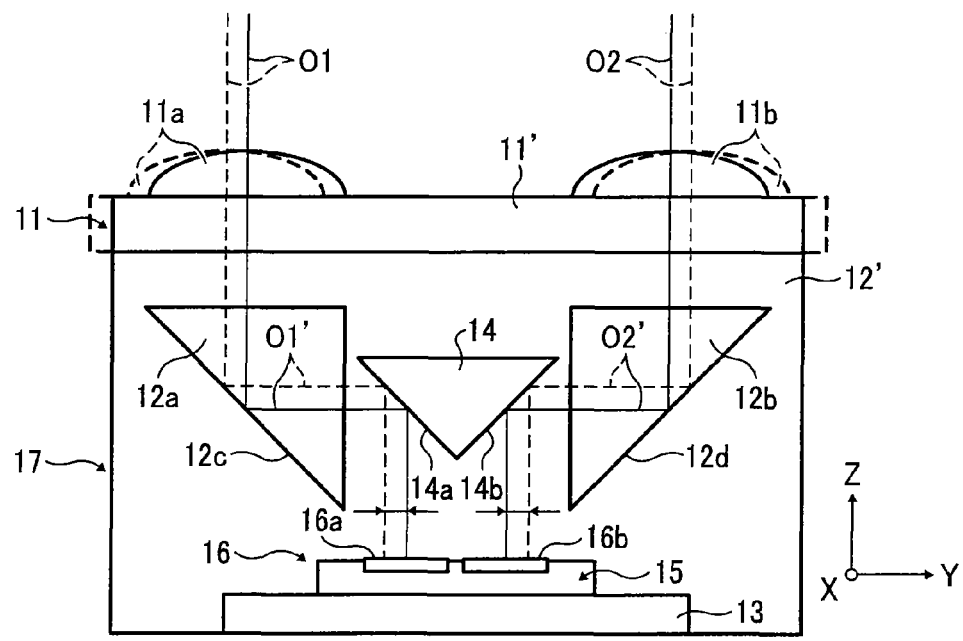
FIG. 3 is a figure explaining a ranging error generated by a change in temperature.

On the other hand, when the reflecting members 12a, 12b and the medium mirror members 14 are formed of a silicon-based material of which the linear coefficient of expansion is small, as illustrated in FIG. 3, even if each of the optical axes O1 and O2 of the ranging lenses 11a and 11b moves in such a direction that the base length D is increased (refer to dashed lines), due to a rise in temperature, the interval between the reflecting planes 12c and 12d changes little.

Figure 4:
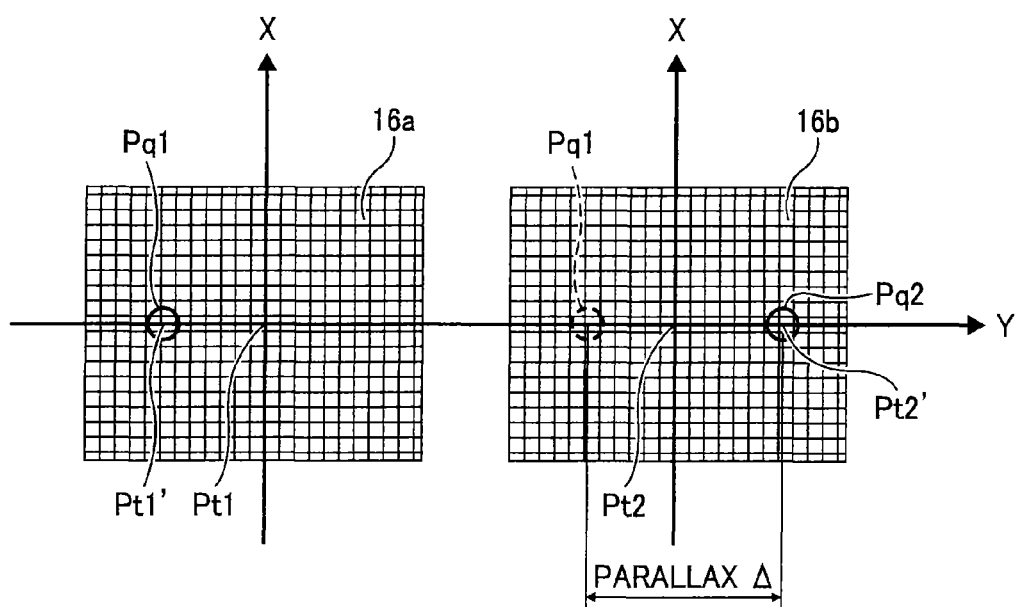
FIG. 4 is a figure explaining the subject image formed on the imaging element illustrated in FIG. 3.

Therefore, the positions of the reflecting light axes O1' and O2' shift, as illustrated in FIG. 3. As a result, due to a change in temperature, a subject image Pq1 (the reflecting light axis O1') is formed in the imaging area 16a at an image formation part pt1' which is different from an image formation part Pt1 before the change in temperatures, as illustrated in FIG. 4. Similarly, by the change in temperature, a subject image Pq2 (the reflecting light axis O2') is formed in the imaging area 16b at an image formation part Pt2' which is different from an image formation part Pt2 before the change in temperature, as illustrated in FIG. 4. That is, the change in temperature causes the parallax Δ.

Figure 5:
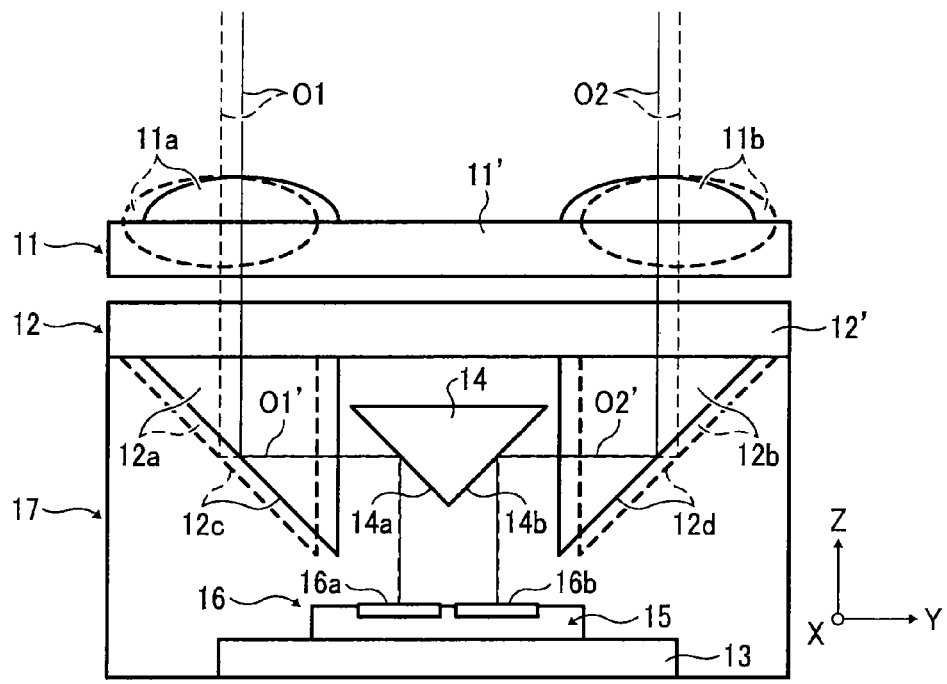
FIG. 5 is figure explaining a ranging device in which a lens array member and a mirror array member are formed of the same material or materials having approximately-same coefficients of linear expansion (linear coefficients of expansion), and the lens array member and the mirror array member are formed separately.

Here, a case in which the lens array member 11 and the mirror array member 12 are integrated, is explained. When the lens array member 11 and the mirror array member 12 are formed of the same plastic material and have the same external dimensions, as illustrated in FIG. 5, the mirror array member 12 expands by only the same amount as the lens array member 11. Therefore, the interval between the reflecting planes 12c and 12d changes in a direction that offsets displacements of the optical axes O1 and O2 relative to the reflecting planes 12c and 12d respectively, when the displacements of the optical axes O1 and O2 are caused due to the rise in temperature. Therefore, the positions of the reflecting light axes O1' and O2' do not change. Therefore, the subject images are formed at the same parts of the imaging areas 16a and 16b respectively, regardless of the change in temperature, as illustrated in FIG. 5.

In addition, even if the lens array member 11 and the mirror array member 12 are not formed of the same plastic material, by using materials with approximately-same linear coefficients of expansion to form the lens array member 11 and the mirror array member 12, displacements of the subject images on the imaging element 16 by the change in temperature can be offset.

In the present invention, a point is to offset the displacements of the subject images on the imaging element 16, resulting from the displacements of the ranging lenses 11a and 11b caused by the change in temperature, by the displacements of the reflecting planes 12c and 12d caused by the change in temperature, the amounts of which are the same as the displacements of the ranging lenses 11a and 11b. Therefore, it is preferable that the reflecting planes 12c and 12d incline to the optical axes O1 and O2 of the ranging lenses by 45 degrees, respectively.

Figure 6A:
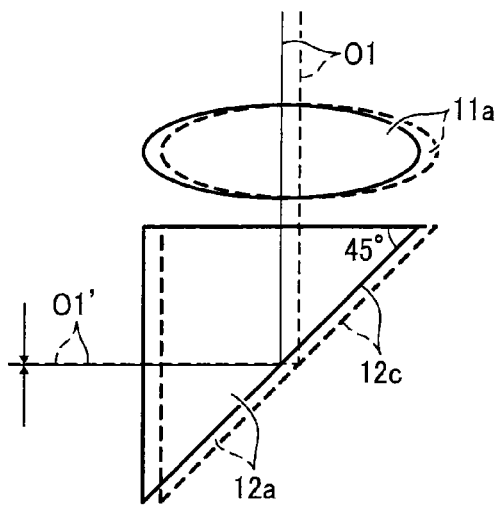
FIG. 6A is a figure explaining incident light and reflected light in a case where a reflecting plane of a reflecting member inclines by 45 degrees relative to an optical axis of a ranging lens.

For example, as illustrated in FIG. 6A, when an inclination of the reflecting plane 12c to the optical axis O1 of the ranging lens 11a is 45 degrees, because a displacement amount of the ranging lens 11a by an expansion is equal to a displacement amount of the reflecting plane 12c of the reflecting member 12a, a displacement of the reflecting light axis O1' is offset. Therefore, displacements of the subject images on the imaging element 16 can be completely offset.

Figure 6B:
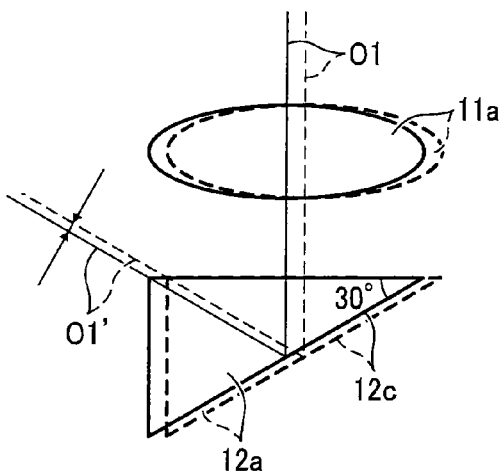
FIG. 6B is a figure explaining incident light and reflected light in a case where a reflecting plane of a reflecting member inclines by 60 degrees relative to an optical axis of a ranging lens.

On the other hand, as illustrated in FIG. 6B, when the inclination of the reflecting plane 12c to the optical axis O1 of the ranging lens 11a is not 45 degrees, a displacement amount of the ranging lens 11a is different from a displacement amount of the reflecting plane 12c. Therefore, the reflecting light axis O1' shifts by the change in temperature, and displacements of the subject images on the imaging element 16 can not be offset completely. Therefore, it is preferable that the inclination angles of the reflecting planes 12c and 12d to the optical axes O1 and O2 be nearly 45 degrees, respectively.

Figure 7:
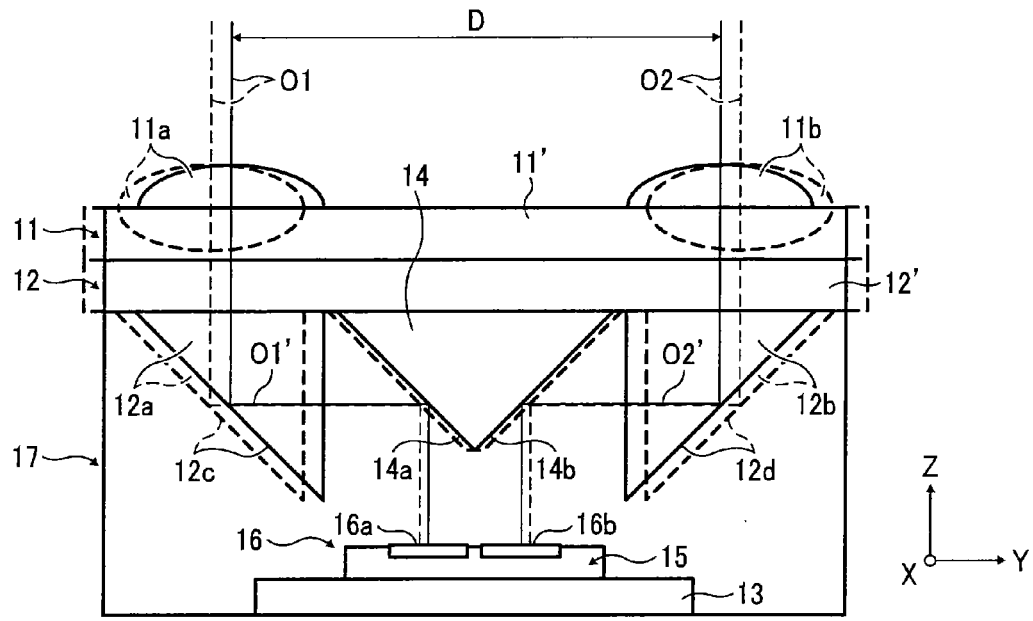
FIG. 7 is a figure explaining incident light and reflected light in a case where the lens array member and the mirror array member and a medium mirror member are formed integrally.

It is preferable that the medium mirror member 14 and the mirror array member 12 be formed separately as much as possible, although it is possible that the medium mirror member 14 and the mirror array member 12 be formed integrally. It is because that, when the medium mirror member 14 is formed of a plastic material, and as illustrated in FIG. 7, the medium mirror member 14 and the mirror array member 12 are formed integrally, displacements of the subject images offset by the integration of the lens array member 11 and the mirror array member 12 may be generated again by an expansion of the medium mirror member 14.

This situation may occur, for example, when the reflecting planes 14a and 14b of the medium mirror member 14 expand by a temperature, and shift along the Y axis, and an angle between the reflecting plane 14a and the reflecting plane 14b changes.

Figure 8:
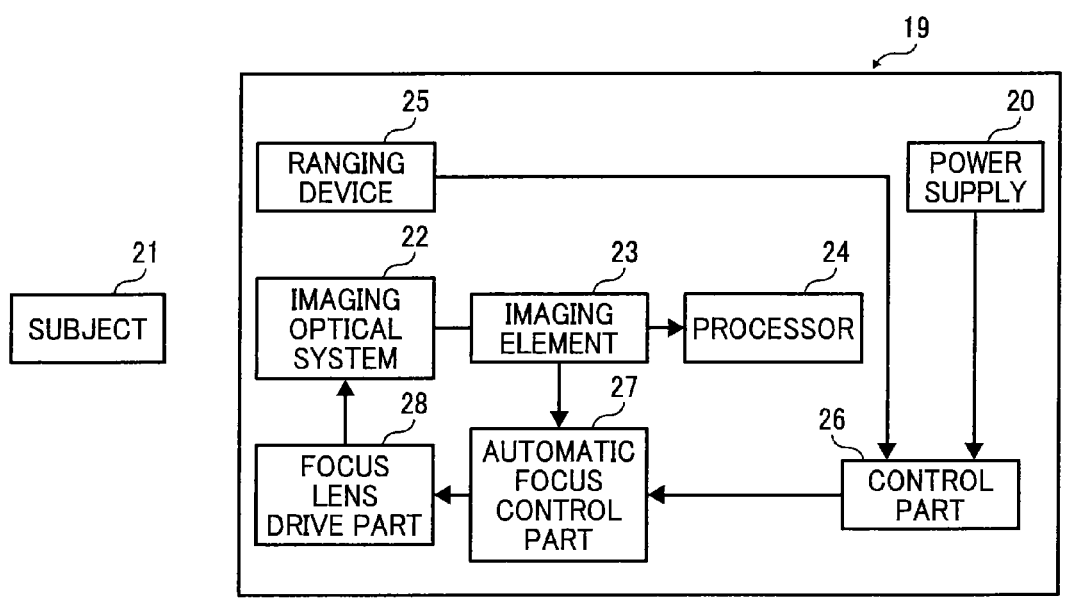
FIG. 8 is a block circuit diagram of an image-capturing device which is equipped with the ranging device according to the present invention.
Figure 9:
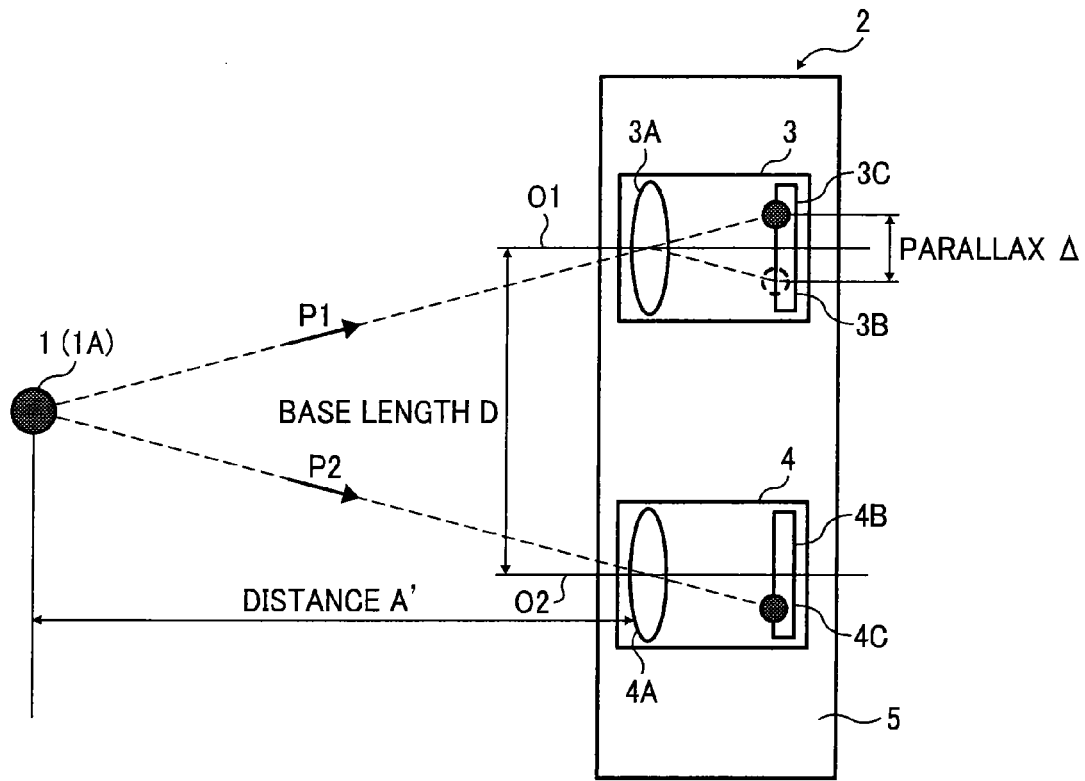
FIG. 9 is a schematic side view of a ranging device illustrating a fundamental principle of range measurement by a conventional stereo camera type ranging device.
Figure 10:
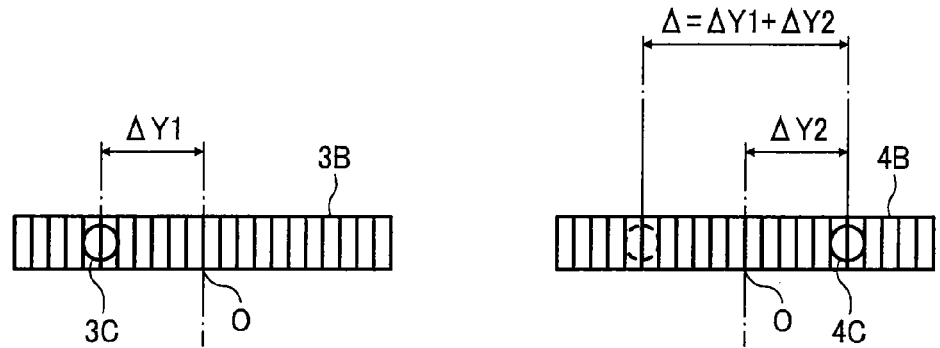
FIG. 10 is figure explaining a parallax detection method by the conventional stereo camera type ranging device.

Next, an embodiment of applying the ranging device according to the present invention to an image-capturing device will be explained, with reference to FIG. 8. In FIG. 8, 19 represents a digital camera as the image-capturing device. The digital camera 19 has a power supply 20, an imaging optical system 22 which images a subject 21, an imaging element 23, a processor 24, a ranging device 25, a control part 26, an automatic focus control part 27, and a focus lens drive part 28.

The imaging element 23 converts a subject image captured by the imaging optical system 22 into an electronic signal, and outputs the electronic signal to the processor 24 and the automatic focus control part 27. The processor 24 performs a predetermined processing on the electronic signal from the imaging element 23, and outputs it to a display part which is not illustrated. The ranging device 25 measures a distance to the subject 21 based on a principle of measuring by triangular distance.

The control part 26 performs a control which will be explained later, based on a result of distance measurement of the ranging device 25. The automatic focus control part 27 performs a control which will be explained later, based on the electronic signal output by the imaging element 23. The focus lens drive part 28 moves a part of the imaging optical system 22 (for example, a focus lens) along a direction of an optical axis, and changes a state of focus of the subject image formed on the imaging element 23.

The automatic focus control part 27 controls the focus lens drive part 28 to sequentially change the states of focus of the subject image, and sequentially evaluates the state of focus based on the electronic signal obtained per each of the states of focus (AF evaluation), and obtains a predetermined state of focus based on the evaluation value. The control part 26 controls the automatic focus control part 27 to carry out the AF evaluation in a neighborhood of a distance obtained by the ranging device 25.

As above-mentioned, the ranging device 25 has the lens array member 11, the ranging lenses 11a and 11b, the mirror array member 12, the reflecting members 12a and 12b, the medium mirror member 14, the imaging element 16, and the ranging computing circuit (illustration is omitted) disposed on the circuit board 13, etc., and measures a distance from the digital camera 19 to the subject 21.

Conventionally, the automatic focus control part 27 is configured to make focus lens groups of the imaging optical system 22 movable, and while moving the focus lens groups over a whole area of the focal length as a scanning range, calculate contrasts of the subject image at each of lens positions of each focus lens group, and decide a position at which the maximum contrast can be obtained after the whole area scanning as a position of an optimum state of focus, i.e., an optimum focus position (focusing position).

This method is called a contrast AF method or a hill-climbing AF method. In this method, because the focusing is performed while actually capturing a subject image, highly accurate focus detection is possible. However, in contrast, although the optimum focus position (focusing position) is decided after the whole area scanning, there is a defect in that it takes time to focus. Particularly, in the digital camera 19 with a zoom function of a high magnification, it takes time to focus.

Then, the control part 26 controls the automatic focus control part 27 to calculate a lens position A of the focus lens group corresponding to the distance to the subject 21 obtained by the ranging device 25, and set a scanning range of ±ΔB with a center on the lens position A, i.e., (A−ΔB to A+ΔB) to be a near focus range. That is, the control part 26 controls the automatic focus control part 27 such that it makes the neighborhood of the lens position corresponding to the distance to the subject 21 be the scanning range of focusing detection.

As a result, the time until coming into focus is shortened, and also an accurate focusing is achieved. Of course, it is possible to drive the focus lens groups by only ranging information of the ranging device 25 and perform the focusing, without carrying out the contrast AF.

In the ranging device 25 according to the present invention, low-cost can be achieved with the plastic lens, and distance information on the subject 21 can be calculated accurately regardless of a change in surrounding temperature, even if a temperature sensor is not provided. Concretely, it can obtain an accurate parallax Δ and an accurate distance A', by offsetting the displacements of the ranging lenses 11a and 11b caused by the expansions of the ranging lenses 11a and 11b associated with the change in temperature, with the displacements of the reflecting members 12a and 12b, regardless of the surrounding temperature.

Thus, according to the imaging device 19 which uses the ranging device 25 of the present invention, a sensor used for detecting a surrounding temperature is unnecessary, therefore low-cost can be achieved, in addition, a focusing with high accuracy can be performed at high-speed, and a subject image can be captured without a click delay of a shutter.

According to the ranging device of the present invention, when the displacements of the ranging lenses are generated by expansion which is caused due to the rise in temperature, each of the reflecting planes of the reflecting members moves by the same distance as a displacement amount of the corresponding ranging lens, therefore, the ranging error caused by the temperature expansion can be offset, and a high distance measurement accuracy can be obtained by only an initial adjustment.

Similarly, the ranging module 17 according to the present invention can be applied to the image-capturing device 19, and the same effects can be obtained.

Any of the ranging device and the ranging module according to the present invention can be applied to usages such as a in-car ranging device, a ranging device for a video camera, a camera used for a portable device, a three-dimensional digital camera, and a monitoring camera.

It should be noted that although the present invention has been described with respect to exemplary embodiments, the invention is not limited thereto. In view of the foregoing, it is intended that the present invention cover modifications and variations provided they fall within the scope of the following claims and their equivalent.

What is claimed is:

1. A ranging device, comprising:
a lens array member which has a first ranging lens and a second ranging lens, optical axes of the pair of ranging lenses being parallel to each other, and first and second optical images of a subject being formed by the first and the second ranging lenses respectively;
a mirror array member which has first and second reflecting members, each of the pair of reflecting members being provided with a reflecting plane which reflects a corresponding optical image of the first and the second optical images from a corresponding ranging lens of the pair of ranging lenses;
a medium mirror member which has a first reflecting plane and a second reflecting plane, the medium mirror member being arranged between the pair of reflecting members, the first and the second reflecting planes reflecting the first and the second optical images reflected by the reflecting planes of the first and the second reflecting members, respectively, to a predetermined direction;
an imaging element which is arranged at a position receiving the first and the second optical images reflected by the first and the second reflecting planes of the medium mirror member respectively to the predetermined direction, and is configured to convert the first and the second optical images to electronic signals; and
an electronic circuit which is configured to calculate a distance to the subject based on the electronic signals output from the imaging element,
wherein:
the medium mirror member and the mirror array member are formed separately,
the lens array member includes a flat plate part,
the mirror array member includes a flat plate part, and
the lens array member and the mirror array member are integrally formed by integrating the flat plate part of the lens array member and the flat plate part of the mirror array member.

2. A ranging device according to claim 1, wherein
the lens array member and the mirror array member are formed of materials having approximately-same coefficients of linear expansion or of a same material, and
the lens array member and the mirror array member are formed separately.

3. A ranging device according to claim 2, wherein the material of the lens array member and the mirror array member is plastic.

4. A ranging device according to claim 1, wherein
the imaging element is formed integrally with a wafer substrate, and
the lens array member and the mirror array member are integral with the wafer substrate.

5. A ranging device according to claim 1, wherein
each of the reflecting planes of the first and the second reflecting members inclines to a corresponding optical axis of the first and the second ranging lenses by 45 degrees, and
each of the first and the second reflecting planes of the medium mirror member inclines to a corresponding optical axis of the first and the second ranging lenses by 45 degrees.

6. A ranging module, comprising:
a lens array member which has a first ranging lens and a second ranging lens, optical axes of the pair of ranging lenses being parallel to each other, and first and second optical images of a subject being formed by the first and the second ranging lenses respectively;
a mirror array member which has first and second reflecting members, each of the pair of reflecting members being provided with a reflecting plane which reflects a corresponding optical image of the first and the second optical images from a corresponding ranging lens of the pair of ranging lenses;
a medium mirror member which has a first reflecting plane and a second reflecting plane, the medium mirror member being arranged between the pair of reflecting members, the first and the second reflecting planes reflecting the first and the second optical images reflected by the reflecting planes of the first and the second reflecting members, respectively, to a predetermined direction;
an imaging element which is arranged at a position receiving the first and the second optical images reflected by the first and the second reflecting planes of the medium mirror member respectively to the predetermined direction, and is configured to convert the first and the second optical images to electronic signals; and an electronic circuit which is configured to calculate a distance to the subject based on the electronic signals output from the imaging element, wherein:

the lens array member includes a flat plate part, the mirror array member includes a flat plate part, the lens array member and the mirror array member are integrally formed by integrating the flat plate part of the lens array member and the flat plate part of the mirror array member, the medium mirror member is formed separately from the mirror array member, and the lens array member and the mirror array member are integrally formed together integral with the imaging element.

7. An image-capturing device, comprising the ranging device according to claim 1.

8. An image-capturing device, comprising the ranging module according to claim 6.

9. An image-capturing device according to claim 7, wherein the image-capturing device includes an automatic focus control part, which is configured to scan a neighborhood of a distance to the subject obtained by the ranging device, and to detect a focusing position to the subject.

* * * * *